United States Patent
Rozzi et al.

(10) Patent No.: US 8,303,220 B2
(45) Date of Patent: Nov. 6, 2012

(54) DEVICE FOR AXIAL DELIVERY OF CRYOGENIC FLUIDS THROUGH A MACHINE SPINDLE

(75) Inventors: Jay Christopher Rozzi, Hanover, NH (US); John Kendall Sanders, Hartland, VT (US); Christian Henry Passow, Etna, NH (US); Michael Phillip Day, Cornish, NH (US); William Morgan Fisher, Rockingham, VT (US)

(73) Assignee: Creare Incorporated, Hanover, NH (US)

( * ) Notice: Subject to any disclaimer, the term of this patent is extended or adjusted under 35 U.S.C. 154(b) by 1080 days.

(21) Appl. No.: 12/428,218

(22) Filed: Apr. 22, 2009

(65) Prior Publication Data
US 2010/0272530 A1    Oct. 28, 2010

(51) Int. Cl.
*B23Q 11/10* (2006.01)
(52) U.S. Cl. .......................... 409/136; 408/57
(58) Field of Classification Search .............. 408/56, 408/57, 59; 409/135, 136
See application file for complete search history.

(56) References Cited

U.S. PATENT DOCUMENTS

| | | | |
|---|---|---|---|
| 4,557,643 A | 12/1985 | Cioci | |
| 4,625,707 A | 12/1986 | Whittaker | |
| 4,890,963 A | 1/1990 | Keritsis | |
| 5,601,386 A | 2/1997 | Wells | |
| 6,050,756 A | 4/2000 | Buchholz et al. | |
| 6,602,031 B2 * | 8/2003 | Hara | 409/131 |
| 2002/0176758 A1 | 11/2002 | Sahm et al. | |
| 2004/0079207 A1 | 4/2004 | Matsumura et al. | |
| 2008/0080943 A1 * | 4/2008 | Bernhard et al. | 409/233 |

FOREIGN PATENT DOCUMENTS

| | | |
|---|---|---|
| DE | 102008020740 A1 | 10/2009 |
| EP | 1958718 A1 * | 8/2008 |
| JP | 2000005975 A * | 1/2000 |
| WO | 99/60079 | 11/1999 |
| WO | 2008/104341 | 9/2008 |

OTHER PUBLICATIONS

JPO Machine Translation—Taguchi, Tetsuya (2000). Japanese Patent No. 2000005975 A.*
Sutherland, John. "Manufacturing Research of Professor John Sutherland: Cutting Fluid Issues." Nov. 6, 1996.*
Zhao, Z. and Hong, S.Y., 1992, "Cooling Strategies for Cryogenic Machining from a Materials Viewpoint," Journal of Materials Engineering and Performance, vol. 1, No. 5, pp. 669-678.

(Continued)

*Primary Examiner* — Daniel Howell
*Assistant Examiner* — Michael Vitale
(74) *Attorney, Agent, or Firm* — Reising Ethington, P.C.

(57) ABSTRACT

Cryogenic fluids are delivered along an axial path through a machine tool spindle to a cutting tool that is mounted in a standard tool holder. An external source of cryogen is delivered via an insulated line to a junction block housing where the cryogen flows into a vacuum insulated coolant delivery tube mounted on the axis of rotation of the spindle. The coolant delivery tube couples with a cryogenic manifold located in a standard tool holder in the end of the spindle. The cryogenic manifold couples the cryogen to a tool that is mounted in the tool holder. Before a tool change operation, the coolant delivery tube is raised to disconnect it from the cryogenic manifold, and to turn off the flow of cryogen to the delivery tube.

16 Claims, 5 Drawing Sheets

OTHER PUBLICATIONS

Paul, S., Dhar, N.R., Chattopadhyay, A.B., 2001,"Beneficial Effects of Cryogenic Cooling Over Dry and Wet Machining on Tool Wear and Surface Finish in Turning AISI 1060 Steel," Journal of Materials Processing Technology, vol. 116, pp. 44-48.

Nishiwaki, N., Hidehiko, T., and Hori, S., 1981, "A Method for Improving the Thermal Behaviour of Machine Tools with Heat Pipes," Bulleting of the Japan Society of Precision Engineering, vol. 15, No. 4, pp. 249-250.

Hong, S.Y. and Ding, Y., 2001, "Micro-Temperature Manipulation in Cryogenic Machining of Low Carbon Steel," Journal of Materials Processing Technology, vol. 116, pp. 22-30.

Lopez de Lacalle, L., Perez-Bilbatua, J., Sanchez, J., Llorente, J., Gutierrez, A., and Alboniga, J., 2000, "Using High Pressure Coolant in the Drilling and Turning ofLow Machinability Alloys," International Journal of Advanced Manufacturing Technology, vol. 16, pp. 85-91.

Wang, Z.Y. and Rajurkar, K.P., 2000, "Cryogenic Machining of Hard-to-Cut Materials," Wear, vol. 239, pp. 168-175.

PCT/US2010/031980 Forms PCT/ISA/210, PCT/ISA/237 mailed Aug. 2, 2010, International Search Report and Written Opinion, 8 pages.

* cited by examiner

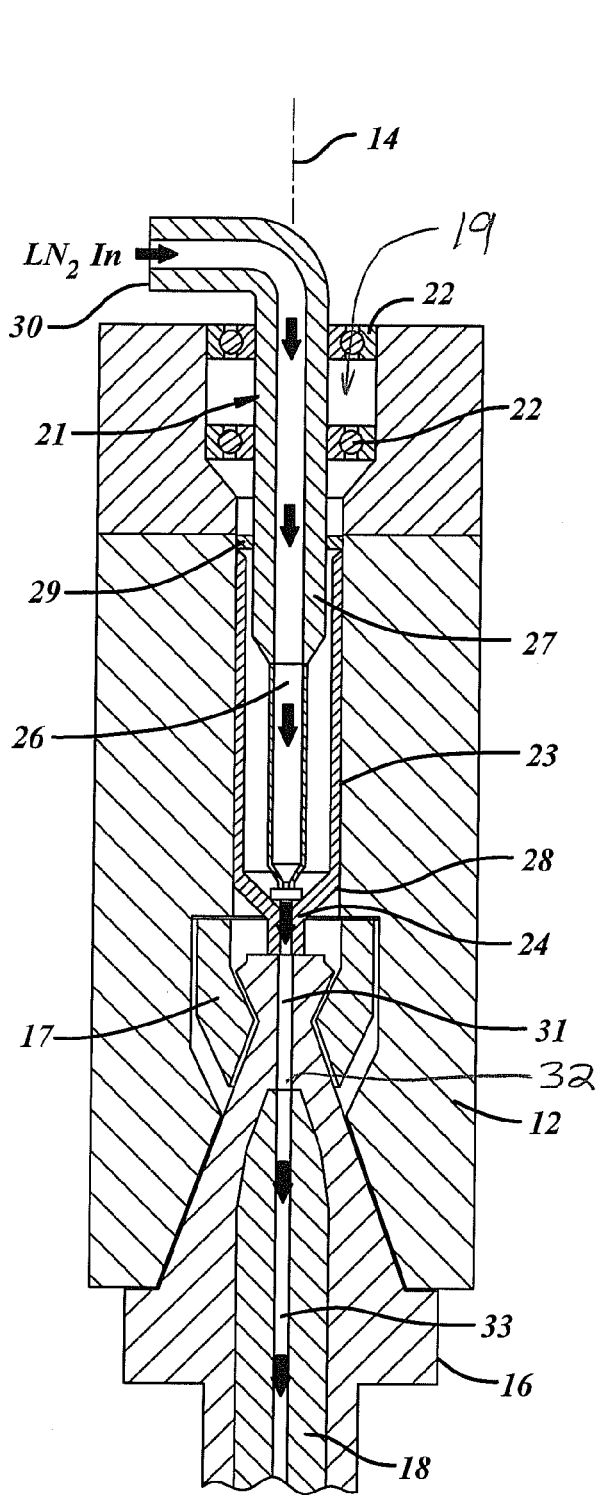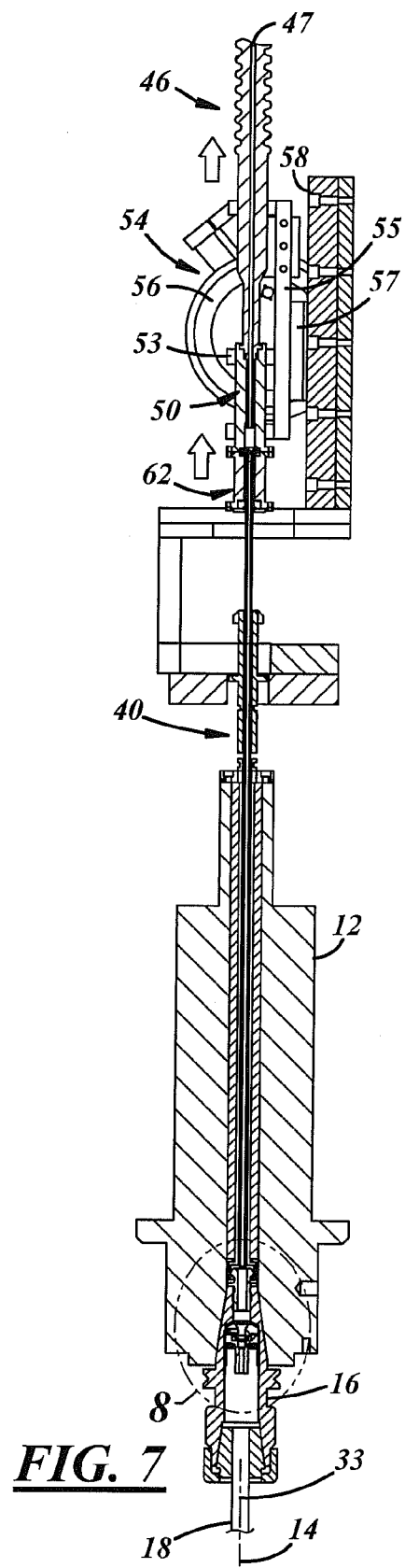
*FIG. 1*  *FIG. 7*

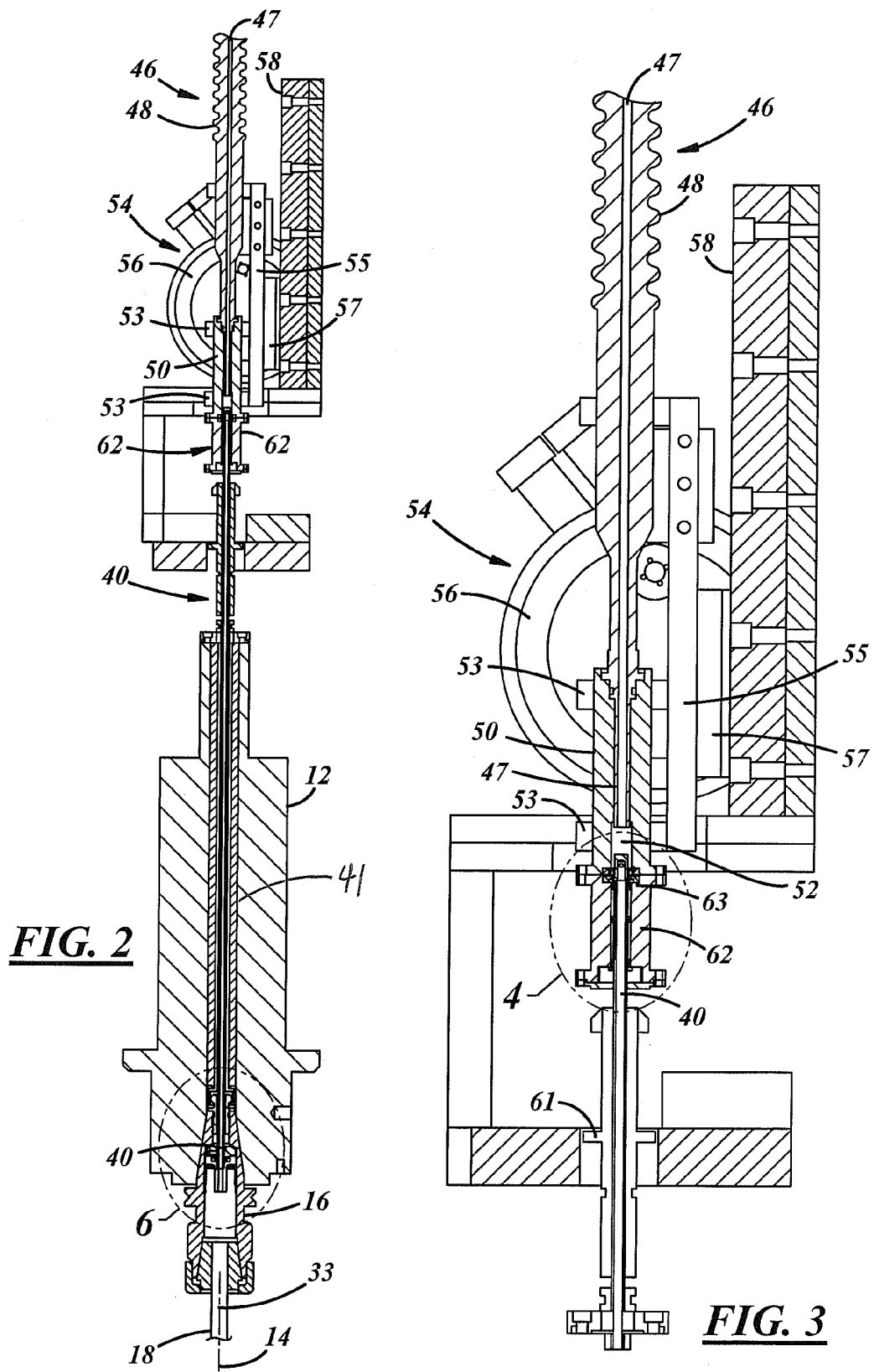

DEVICE FOR AXIAL DELIVERY OF CRYOGENIC FLUIDS THROUGH A MACHINE SPINDLE

This invention was made with Government support under Contract Nos. N68335-08-C-0263, and FA8650-07-C-5311 awarded by the Department of the Navy and the Air Force. The Government has certain rights in the invention.

FIELD

A cryogenic cutting fluid is delivered to a rotating cutting tool mounted in a standard tool holder and driven by a spindle.

BACKGROUND

Ceramic matrix composites and other advanced aerospace materials with low thermal conductivity are notoriously expensive and difficult to machine because these materials are not able to readily disperse heat away from the tool-chip interface. By more effectively cooling the tool-chip interface, machining speeds and tool life can be increased, resulting in lower machining costs and faster production times. Since most production machining is done with machine tools using automatic tool changers, any such cooling system has to be compatible with commercially available tool changers and tool holder systems.

OBJECTIVES

It is an objective of the present device to provide a novel cooling system for a rotating cutting tool that is mounted in a standard tool holder on a spindle.

It is another objective to provide a novel cooling system for rotating cutting tools that is compatible with commercially available tool changing and tool holder systems.

SUMMARY

The cooling system described herein combines a rotary coupling with a modified commercial tool system that allows a cryogen such as liquid nitrogen ($LN_2$) to be conveyed to the tool-chip interface during machining operations. This is accomplished by the axial delivery of cryogenic fluids along an axial path through a machine tool spindle to a cutting tool that is mounted in a standard tool holder. As a result, extremely hard, low thermal conductivity aerospace materials including ceramic matrix composites, metal matrix composites, and other materials are able to be machined at high speed. In addition, conventional materials are able to be machined without the use of cutting fluids, resulting in a more environmentally friendly machining process.

BRIEF DESCRIPTION OF THE DRAWINGS

FIG. 1 shows one embodiment of a cryogen delivery system for a rotating tool.

FIG. 2 shows an alternate embodiment of a cryogen delivery system for a rotating tool.

FIG. 3 shows the slide bearing and actuator used to raise and lower the coolant delivery tube in the cryogen delivery system of FIG. 2.

FIG. 7 shows the linear bearing, the drive housing, and the coolant delivery tube in the raised position.

DESCRIPTION OF THE PREFERRED EMBODIMENT

Figure 4:
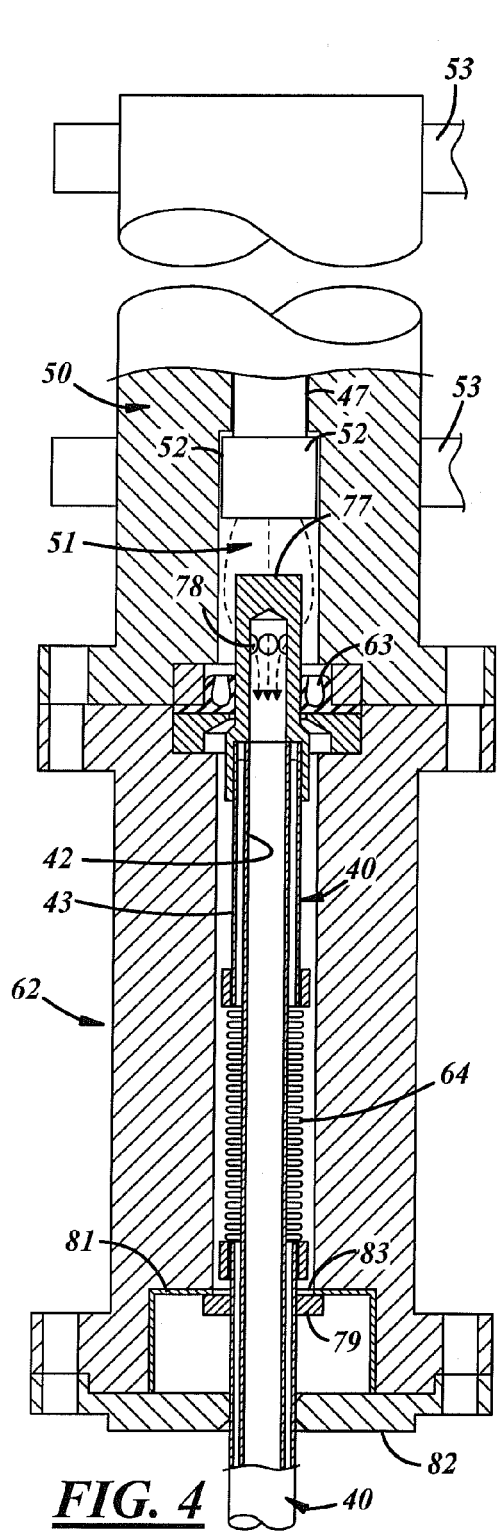
FIG. 4 is a detail view of the drive housing in the lowered position.

FIG. 1 shows a cryogenically cooled cutting system for a rotating cutting tool generally designated by the reference numeral 10. The system comprises a spindle 12 that is driven by conventional means such as a spindle motor (not shown) to rotate about a central axis of rotation 14. The spindle receives a standard tool holder 16 on a first end that is locked onto the spindle by a collet mechanism 17 as well known in the art. The tool holder 16 supports a cutting tool 18 (only the top portion of which is shown). The spindle 12 has an axial socket opening 19 on a second end that receives a non-rotating bayonet style cryogen delivery device 21. The bayonet delivery device 21 is received in the axial socket opening 19 by a pair of bearings 22 that position the delivery device 21 on the axis of rotation 14 of the spindle. A socket liner 23 that rotates with the spindle is positioned in the lower portion of the axial socket opening 19. The lower end of the socket liner 23 has an axially aligned discharge port 24.

The bayonet delivery 21 device comprises small diameter vacuum insulated delivery tube 26 that has an upper portion that is surrounded by a larger diameter vacuum insulated section 27. The delivery tube 26 has an internal passageway that receives cryogen at a first end 30 from a suitable source (not shown) located outside of the spindle 12. A second end of the delivery tube 26 has an outlet 28 that is aligned with the axis of rotation 14 of the spindle. The outlet 28 is located above the discharge port 24 of the socket liner 23. An annular seal 29 is positioned in the socket 19 and provides a seal between the large diameter insulated section 27 and the rotating spindle body 12. The annular seal 29 is spring actuated, and can be termed a warm seal because it is shielded from the temperature of the cryogen in the bayonet delivery device 21 by the large diameter insulated section 27, the outer surface of which is not at cryogenic temperature.

The discharge port 24 on the end of the socket liner 23 is positioned above an axial passage 31 formed along the axis of the tool holder 16. The axial passage 31 in the tool holder has an outlet 32 that is aligned with a coolant passage 33 formed in the shaft of the cutting tool 18. The coolant passage 33 leads to one or more coolant outlets (not shown) formed on the cutting tool 18 that will direct coolant to the tool-chip interface.

The physical and dynamic characteristics of the spindle used in the cryogenically cooled cutting system shown in FIG. 1 are the same as existing CNC spindles and permit machining operations such as drilling, countersinking, and complex edge milling with long reaches to be easily performed. The tool holder 16 is the same shape and size as those used in commercially available tool holder systems and as a result can be used with automatic tool changers. Because the small diameter vacuum insulated delivery tube 26 is aligned with the axis of rotation 14 of the spindle, and has a small mass, it will not adversely affect high speed spindle performance. The coolant path along the axis of rotation 14 of the spindle 12, the tool holder 16 and the tool 18 permits high speed spindle rotation without centrifugal forces created by the rotation of the spindle affecting coolant flow. Because the discharge port 24 of the socket liner 23 is in direct axial alignment with the axial passage in the tool holder 16, coupling the tool holder to the collet mechanism 17 in the spindle 12 establishes the coolant delivery path from the internal delivery tube 26 to the shaft 18 of the cutting tool whenever a new tool is mounted in the spindle by an automatic tool changing mechanism.

FIGS. 2-8 show an alternate embodiment of a cryogenically cooled cutting system in which the interface between the non-rotating cryogen source and the rotating spindle is located at the end of a rotating tube that extends from the top of the spindle. Additionally, the embodiment of FIGS. 2-8 is specifically adapted to be compatible with automatic tool changing systems and tool holders that are used with such systems.

As shown in FIG. 2, a standard spindle 12 having an axis of rotation 14 receives a tool holder 16 with a tool 18 having an internal coolant passage 33 in a first or bottom end of the spindle. A vacuum insulated coolant delivery tube 40 is mounted in an axial passage 41 in the spindle 12 and extends from the tool holder 16, through the spindle 12, and into a drive housing 62.

A standard cryogen supply line 46 is coupled to an outside source of cryogen (not shown) and comprises an inner tube 47 and outer sheath 48. The space between the inner tube 47 and outer sheath 48 of the cryogen supply line may contain a vacuum for insulation purposes. The outer sheath 48 of the cryogen supply line 46 terminates at the top of a junction block housing 50, and the smaller diameter inner tube 47 is coupled to a junction block 52 located in a lower portion of the junction block housing best seen in FIG. 3. Communication of cryogen from the cryogen supply line 46 to the coolant delivery tube 40 is controlled by a valve mechanism located at the junction of the junction block housing 50 and drive housing 62 and described in greater detail below. The junction block housing 50 is fastened by clamp arms 53 to mounting plate 55 that is coupled to a rotary actuator 54. The rotary actuator 54 comprises a driver actuator 56 and a linear bearing 57 that is mounted on a slide surface 58. The driver actuator 56 is under suitable control and can be actuated to raise the linear bearing 57 from the bottom of the slide surface 58 as shown in FIGS. 2 and 3 to the top of the slide surface as shown in FIG. 7, and vice versa. As the linear bearing 57 raises and lowers, the junction block housing 50, the drive housing 62, and the cryogen delivery tubes 46 and 40 also raise and lower.

Figure 5:
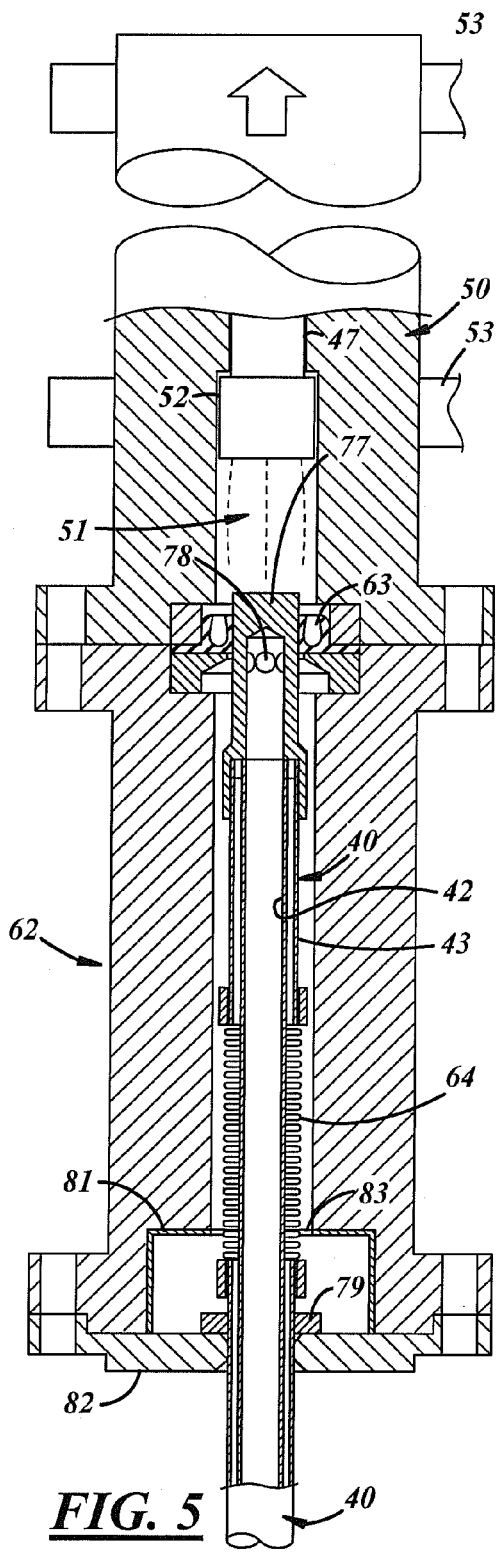
FIG. 5 is a detail view of the drive housing in the raised position.

FIG. 3 shows the junction block 52 in the lower end of the junction block housing 50. The junction block 52 receives the end of the small diameter inner tube 47 and holds it secure in the junction block housing 50. The junction block 52 allows cryogen to flow freely out of the end of the small diameter tube 47 into the space 51 below the junction block 52, as shown in FIGS. 4 and 5. FIG. 3 also shows that the upper portion of the coolant delivery tube 40 extends outside of the spindle 12 and passes through a tool change piston 61. The tool change piston 61 imparts a force to a tool change mechanism, and forms no part of the present invention. The upper end of the coolant delivery tube 40 passes through the drive housing 62 that is attached to the bottom of the junction block housing 50.

FIG. 4 shows the mechanism for establishing flow between the inner tube 47 of the cryogen supply line 46 and the coolant delivery tube 40. The coolant delivery tube 40 comprises an inner small diameter tube 42 surrounded by an outer sheath 43. A vacuum in the space between the small diameter tube 42 and the outer sheath 43 provides insulation for the cryogen that is contained in the small diameter tube 42. A portion of the inner tube 42 of the coolant delivery tube 40 within the drive housing 62 is surrounded by a bellows 64. The bellows 64 is compliant and allows for length contraction of the outer sheath 43 of the coolant delivery tube 40 when the inner small diameter inner tube 42 is at cryogenic temperature and the outer sheath 43 is at ambient temperature.

The drive housing 62 includes a valve arrangement that turns the cryogen flow from the cryogen supply line 46 on or off as a result of the lowering or raising of the junction block housing 50 by the linear actuator 54. The top of the coolant delivery tube 40 is fitted with an end cap 77 that is provided with ports 78 so that the only flow through the end of the coolant delivery tube 40 is through the ports 78. An upper spring reinforced polymer seal 63 is mounted on the upper end of the drive housing 62. The outer surface of the end cap 77 seals against the upper spring reinforced polymer seal 63. The combination of the ported end cap 77 and the seal 63 form the valve arrangement. A thrust disc 79 is mounted on the coolant delivery tube 40 in a position to be trapped in the lower portion of the drive housing 62 by an inverted cup 81 that is attached to the lower end 82 of the drive housing. The inverted cup 81 has an aperture 83 that lets the coolant delivery tube 40 pass freely therethrough, but which is too small to allow the thrust disc 79 to pass therethrough.

FIG. 4 shows the drive housing 62 in a lowered position, after the junction block housing assembly 50 has been lowered by the linear actuator 54. Lowering the junction block housing assembly 50 lowers the position of the seal 63 on the end cap 77 until the ports 78 on the end cap are above the seal 63, and the thrust disc 79 abuts against the top of the cup 81. This allows cryogen to flow from the space 51 below the junction block 52 through the ports 78 to the interior of the coolant delivery tube 40.

FIG. 5 shows the drive housing 62 in a raised position, after the junction block housing assembly 50 has been raised by the linear actuator 54. Raising the junction block housing assembly 50 raises the position of the seal 63 on the end cap 77 until the ports 78 on the end cap are below the seal 63, and the thrust disc 79 abuts against the lower end 82 of the drive housing. This blocks the flow of cryogen from the space 51 below the junction block 52 through the ports 78 to the interior of the coolant delivery tube 40.

Figure 6:
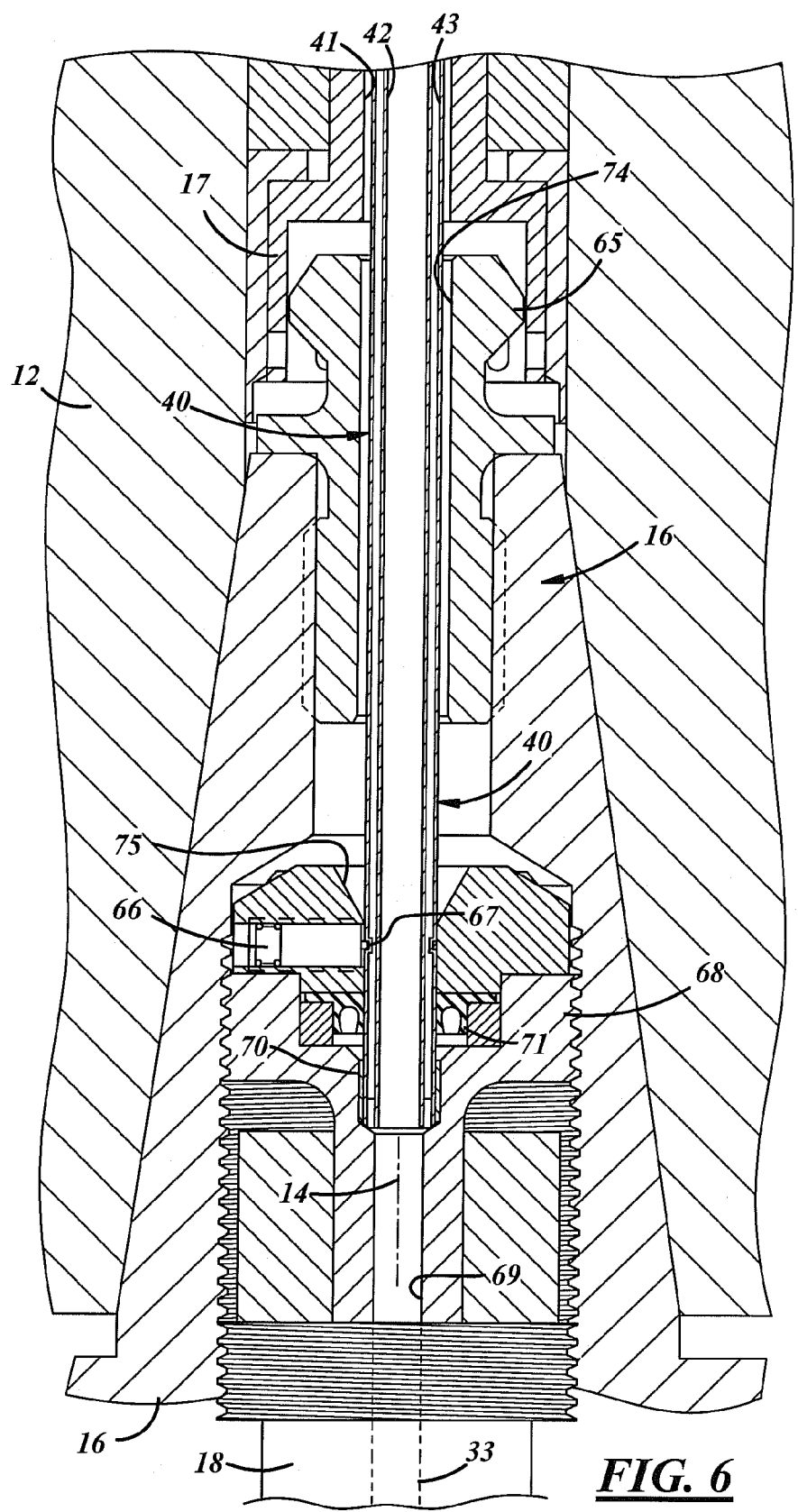
FIG. 6 is a detail view of the tool holder with the coolant delivery tube in the lowered position.

FIG. 6 shows the lower end of the spindle 12 and the upper end of the tool holder 16 with the coolant delivery tube 40 in the lowered position. A standard collet mechanism 17 in the spindle grips a tool holder pull stud 65 on the top of the tool holder 16 to secure the holder in the end of the spindle 12. An insulated cryogenic manifold 68 is mounted in the interior of the tool holder 16 and has a coolant passage 69 positioned on the axis of rotation 14 of the tool holder for conveying cryogen from the end of the coolant delivery tube 40 to an axial passage 33 in a tool 18 that is mounted in the tool holder. A cone shaped guide 75 is positioned above the cryogenic manifold 68. The cone shaped guide 75 has an array of spring plunger mechanisms 66 that engage matching detents 67 (only one shown) formed near the end of the coolant delivery tube 40 when the coolant delivery tube is fully inserted into the tool holder 16. The top of the coolant passage 69 in the cryogenic manifold may be fitted with a bushing 70 that receives the end of the coolant delivery tube 40. The insulated cryogenic manifold 68 may be fabricated from a low thermal conductivity material such as polytetrafluoroethylene. The insulated cryogenic manifold 68 carries a lower spring reinforced polymer seal 71 that provides a seal against the outer surface of the coolant delivery tube 40. The lower end of the insulated cryogenic manifold 68 is positioned above the top of a tool 18 that is mounted in the holder 16. The coolant passage 69 in the insulated cryogenic manifold 68 is in axial alignment with the axial coolant passage 33 formed in the shaft of the tool 18.

In use, the spindle 12 and the coolant delivery tube 40 rotate as a unit, and the seal between the rotating delivery tube 40 and the non-rotating structure of the cryogen supply occurs at the upper spring reinforced polymer seal 63 at the bottom of the junction block housing 50. Cryogen is supplied via the stationary vacuum insulated supply line 46 to the space 51 below the junction block 52 in the junction block housing 50. As long as the ports 78 in the end cap 77 on the end of the coolant delivery tube 40 are above the seal 63 as shown in FIG. 4, cryogen flows from the interior of the junction block housing 50 into the coolant delivery tube. The coolant delivery tube 40 delivers cryogen to the insulated cryogen manifold 68. The lower spring reinforced polymer seal 71 engages the end of the coolant delivery tube 40 and prevents leakage of cryogen as it is transferred to the axial passage 69 in the insulated cryogenic manifold 68. Coolant in the axial passage 69 is conveyed through the axial passage 33 in the tool 18 to the cutting edge of the tool.

Figure 8:
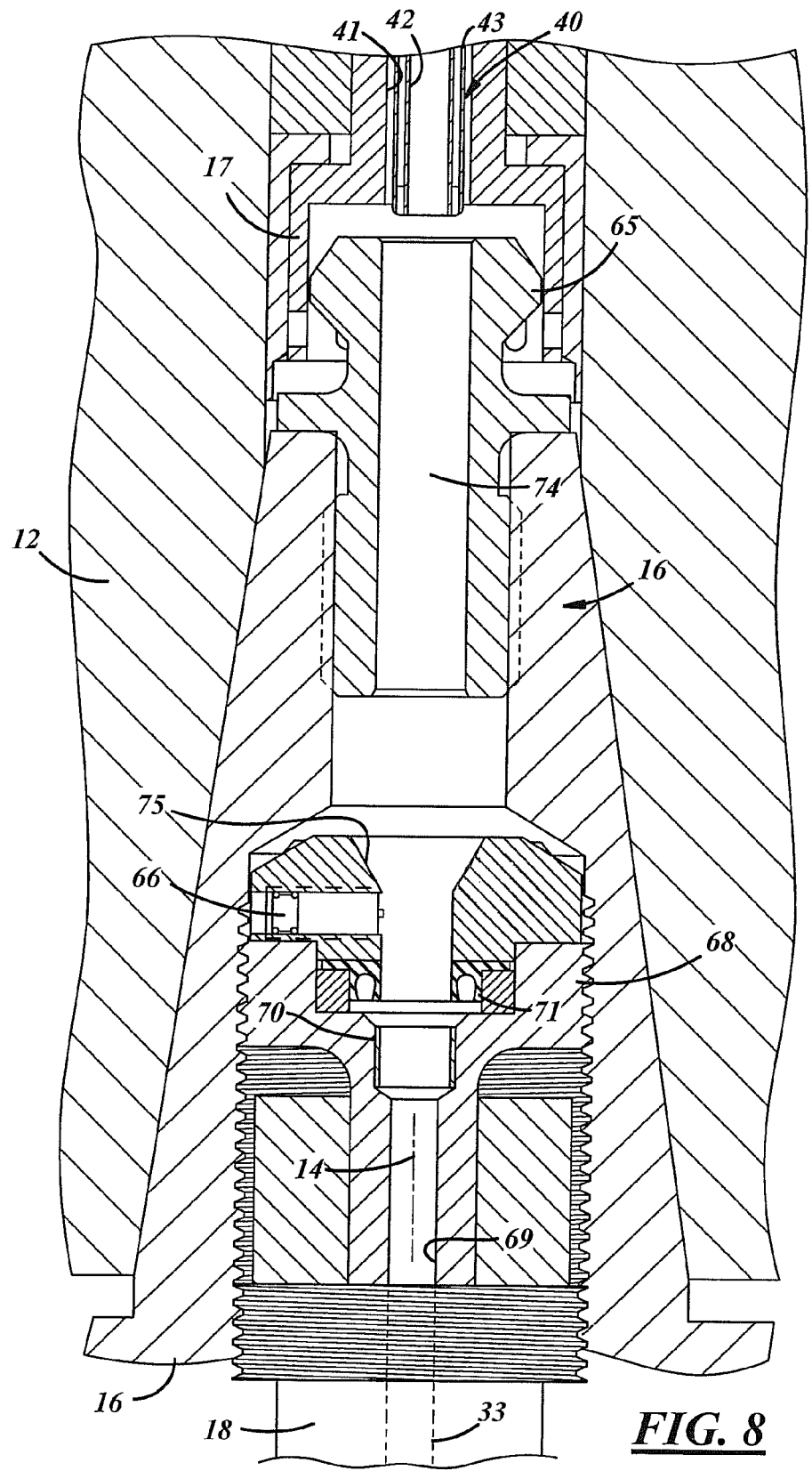
FIG. 8 is a detail view of the tool holder with the coolant delivery tube in the raised position.

When a tool 18 and the associated tool holder 16 are mounted in the spindle 12, the coolant delivery tube 40 is positioned in the tool holder as shown in FIG. 6. Prior to a tool change operation, the driver actuator 56 raises the junction block housing 50 as shown in FIG. 7. This turns off the flow of cryogen from the junction block housing to the coolant delivery tube 40 as shown in FIG. 5, and withdraws the coolant delivery tube 40 from the tool holder 16 so that the end of the coolant delivery tube 40 is positioned above the tool holder pull stud 65 as shown in FIG. 8. The coolant delivery tube 40 remains in the raised or withdrawn position until the next tool holder 16 and tool has been inserted into the spindle and the collet 17 engages the tool holder pull stud 65. Once the tool holder 16 is secured in the end of the spindle 12, the driver actuator 56 lowers the junction block assembly 50. The coolant delivery tube 40 passes through an axial aperture 74 in the tool holder pull stud 65 and is guided by the cone shaped guide 75 into the bushing 70 positioned at the top of the coolant passage 69 in the insulated cryogenic manifold 68. This lowers the seal 63 around the end cap 77 to the position shown in FIG. 4, and re-establishes the flow of cryogen from the space 51 below the junction block 52 through the ports 78 and into the coolant delivery tube 40.

Having thus described the invention, various alterations and modifications will occur to those skilled in the art, which alterations and modifications will be within the scope of the invention as defied in the appended claims.

We claim:

1. A device for axial delivery of a cryogen coolant through a machine spindle to a tool mounted in a tool holder that is mounted in the spindle, the device comprising:
    an insulated tube for receiving cryogen coolant from a source external to the spindle;
    an axial socket opening on the rotary axis of the spindle for receiving the insulated tube, the axial socket opening being at the end of the spindle that is opposite the tool holder;
    a socket liner mounted in the axial socket opening that surrounds the insulated tube;
    a large diameter insulated section comprising at least a portion of the insulated tube;
    a seal positioned in the axial socket opening for sealing between the axial socket opening and the large diameter insulated section of the insulated tube, whereby the large diameter insulated section of the insulated tube shields the seal from the cryogenic temperature of the cryogen coolant; and,
    an axial passage in the tool holder for receiving cryogen from the insulated tube.

2. The device of claim 1 further comprising:
    a discharge port formed in the end of the socket liner, the discharge port being in axial alignment with the end of the insulated tube and the axial passage in the tool holder, whereby the cryogen from the insulated tube is delivered along an axial path from the insulated tube to the discharge port in the socket liner and from the discharge port in the socket liner to the axial passage in the tool holder.

3. The device of claim 2 further comprising:
    at least one bearing positioned in the axial socket opening, the bearing positioning the insulated tube on the axis of rotation of the spindle.

4. A device for axial delivery of a cryogen coolant through a machine spindle to a tool mounted in a removable tool holder that is mounted on the end of the spindle, the device comprising:
    a cryogen supply line for delivering cryogen coolant from an external source;
    a coolant delivery tube for receiving cryogen coolant from the cryogen supply line;
    an axial passage in the spindle for receiving cryogen coolant from the coolant delivery tube;
    a valve arrangement for controlling the flow of cryogen between the cryogen supply line and the coolant delivery tube, whereby the flow of cryogen may be stopped when the removable tool holder is removed from the spindle,
    a first housing surrounding the end of the cryogen supply line and forming a space above the valve arrangement that receives cryogen from the cryogen supply line;
    an actuator coupled to the first housing, whereby the actuator raises and lowers the first housing to control the valve arrangement and to control flow of cryogen from the cryogen supply line to the coolant delivery tube; and,
    an axial passage in the tool holder for receiving the end of the coolant delivery tube, whereby raising the first housing surrounding the end of the cryogen supply line withdraws the end of the coolant delivery tube from the axial passage in the tool holder.

5. The device of claim 4 further comprising:
    a cryogenic manifold mounted in the tool holder for receiving the end of the coolant delivery tube; and,
    an axial passage in the cryogenic manifold, whereby the axial passage in the cryogenic manifold receives cryogen from the coolant delivery tube and delivers the cryogen to a tool that is mounted in the tool holder.

6. The device of claim 5 further comprising:
    at least one spring plunger mounted in the cryogenic manifold; and,
    a detent formed in the end of the coolant delivery tube, whereby the spring plunger engages the detent when the coolant delivery tube is fully inserted into the cryogenic manifold.

7. The device of claim 5 wherein the cryogenic manifold comprises a low thermal conductivity material.

8. The device of claim 7 wherein the material comprising the cryogenic manifold is polytetrafluoroethylene.

9. The device of claim 4 further comprising:
    an end cap on the end of the coolant delivery tube, the end cap having ports for establishing cryogen flow to the interior of the coolant delivery tube; and, a seal engaging the outer surface of the end cap, whereby controlling the position of the seal on the end cap controls the flow through the ports to the interior of the coolant delivery tube.

10. The device of claim 9 further comprising:
a second housing coupled to the end of the first housing, the second housing containing the end of the coolant delivery tube, whereby the actuator raises and lowers the first and second housings to control the position of the seal on the end cap of the coolant delivery tube to control cryogen flow from the cryogen supply line to the coolant delivery tube.

11. The device of claim 5 further comprising:
a seal mounted in the cryogenic manifold and surrounding a portion of the axial passage in the cryogenic manifold, the seal engaging the end of the coolant delivery tube when it is fully inserted into the tool holder for preventing leakage from the end of the coolant delivery tube when it is fully inserted into the cryogenic manifold.

12. The device of claim 5 further comprising:
a cone shaped guide mounted on top of the cryogenic manifold, the cone shaped guide aligning the end of the coolant delivery tube when it is being lowered into the cryogenic manifold.

13. The device of claim 1 wherein the insulated tube for receiving cryogen coolant from an external source comprises a small diameter vacuum insulated tube.

14. The device of claim 1 wherein the large diameter insulated section of the insulated tube is vacuum insulated.

15. The device of claim 4 wherein the cryogen supply line comprises a vacuum insulated tube.

16. The device of claim 4 wherein the coolant delivery tube comprises a small diameter vacuum insulated tube.

* * * * *